2,854,480

PROCESS FOR THE SEPARATION OF POLYCARBOXYLIC ACIDS FROM MIXTURES CONTAINING THE SAME

Horst Kosche, Dusseldorf-Holthausen, Germany, assignor to Henkel & Cie. G. m. b. H., Dusseldorf-Holthausen, Germany, a corporation of Germany No Drawing. Application August 5, 1955
Serial No. 526,787

Claims priority, application Germany August 11, 1954

5 Claims. (Cl. 260—537)

This invention relates to a process for the separation of water-insoluble polycarboxylic acids from mixtures containing such polycarboxylic acids together with water-insoluble components which, in some cases, may also be polycarboxylic acids. More particularly, the process according to the present invention involves the extraction of water-insoluble polycarboxylic acids having the general structural formula $$R_x(COOH)_n$$

wherein R is an organic radical, preferably a hydrocarbon radical having $x$ carbon atoms, $x$ being a whole number from 0 to 40, preferably from 4 to 25, and $n$ is a whole number greater than 1, preferably from 2 to 7, employing aqueous formic acid or dimethylformamide solutions as the extraction agent.

I have found that aqueous solutions of formic acid or dimethylformamide, particularly 5 to 70% and preferably 10 to 50% solutions, possess a selective capability to dissolve polycarboxylic acids, especially at elevated temperatures. As the temperature increases, the solubility of the polycarboxylic acids in the aqueous solutions increases. However, monocarboxylic acids with at least 10 carbon atoms in the molecule dissolve in such aqueous solutions to a considerably lesser degree, even at elevated temperatures. Similarly, the selective capability to dissolve polycarboxylic acids increases with decreasing concentrations of formic acid or dimethylformamide in the aqueous solution.

The mixtures serving as starting materials in the process according to the present invention are mixtures of dicarboxylic or polycarboxylic acids with monocarboxylic acids and/or other water-insoluble substances, such as hydrocarbons, esters, alcohols, aldehydes, ketones, and the like.

Such mixtures may be obtained in any suitable manner; for example, from unsaturated fatty acids or their functional derivatives which have been split into mono- and polycarboxylic acids by a suitable oxidation treatment. Such splitting may be carried out in a single operation; for example, by treating the unsaturated fatty acids with nitric acid, chromic acid or ozone. The mixtures may, however, also be produced from intermediate oxidation products, for example from epoxy, dioxy or halogenoxy derivatives of unsaturated fatty acids, which are split into mixtures of corresponding mono- and polycarboxylic acids, preferably mono- and dicarboxylic acids, in a well known manner, for example by fusion with alkalies.

The dicarboxylic acids formed by such procedures contain, in most cases, from 7 to 16 carbon atoms in the molecule.

However, the mixtures to be treated in accordance with the present invention may also be produced by other methods; for example, by oxidizing hydrocarbons, alcohols or aldehydes, whereby polycarboxylic acids with three or more carboxyl groups in the molecule are formed in addition to dicarboxylic acids. Alcohols or aldehydes which produce mixtures of mono- and polycarboxylic acids upon oxidation are also accessible through a catalytic addition reaction between carbon monoxide and hydrogen and polyolefins or unsaturated alcohols, aldehydes or carboxylic acids.

Finally, the starting material which is subjected to the extraction process according to the present invention may also consist of polycarboxylic acids which have been produced by an acid or alkaline hydrolysis of synthetic materials, or synthetic waste material, containing derivatives of polycarboxylic acids.

In addition to various polycarboxylic acids, the starting mixtures may also contain monocarboxylic acids and/or other organic compounds, such as esters, alcohols, aldehydes, ketones and hydrocarbons.

The preceding paragraphs are only representative examples of various origins of the mixtures containing polycarboxylic acids which may be extracted according to the procedure of the invention. In addition, all those mixtures may be used as starting materials which contain non-aromatic, preferably purely aliphatic, polycarboxylic acids. Within the scope of the disclosure, the term "polycarboxylic acids" is primarily intended to designate, but is not limited to, non-polymeric compounds with from 2 to 4 carboxyl groups in the molecule. However, also polycarboxylic acids with a greater number of carboxyl groups in the molecule may be separated by the present method from mixtures with monocarboxylic acids or other materials; such polycarboxylic acids are obtained, for example, by reacting mono- or poly-unsaturated fatty acids with maleic acid anhydride to yield tri-, penta- or hepatcarboxylic acids or their partial anhydrides having from 20 to 40 carbon atoms in the molecule, depending upon the number of double bonds in the starting material and the extent of reaction with the maleic acid anhydride.

For the sake of simplicity, the present invention will be described first with respect to its application to the extraction of dicarboxylic acids.

Some of the above-described processes which yield the mixtures containing dicarboxylic acids which are to be extracted according to the present invention also form varying amounts of monocarboxylic acids or other compounds containing oxygen atoms with less than 10 carbon atoms in the molecule. If these lower monocarboxylic acids or other compounds are relatively soluble in the extraction agent under the prevailing conditions during the extraction process according to the present invention, it is advisable to separate them from the initial mixture prior to the start of the extraction process.

The process for extraction of the dicarboxylic acids according to the present invention makes use of a well known principle—namely, first bringing the mixture containing the dicarboxylic acids into intimate contact with an immiscible extraction agent at elevated temperatures, and then separating the two phases. This may be very easily accomplished by first stirring the aqueous phase containing from 5 to 70% formic acid or dimethylformamide in the presence of the immiscible oily phase containing the dicarboxylic acids, allowing the two phases to settle out, and then physically separating the two phases from each other. The settling of the phases and their separation can be effectively aided by centrifuging or other suitable methods. In carrying out the instant process in a continuous fashion, the use of continuous extraction apparatus, for example columns, extraction centrifuges, and the like, is particularly advantageous. The resulting products obtained by this method are a hot solution of dicarboxylic acids in the extraction agent and an extraction residue completely free from or poorer in dicarboxylic acids.

The preferred temperatures employed in the extraction process may range from 50 to 100° C., but, if desired, temperatures above 100° C., for example up to 250° C., may be used. In all cases, however, the extraction apparatus must be kept at an elevated pressure so as to prevent the contents from boiling.

The amount of extraction agent to be used for the extraction of polycarboxylic acids according to this invention should be such that at least two molecules of formic acid or dimethylformamide are present for each molecule of polycarboxylic acid. In most cases, however, the amount of extraction agent is in excess of this minimum, namely from 10 to 500, preferably from 10 to 100, molecules of formic acid or dimethylformamide per molecule of polycarboxylic acid. In order to obtain optimum results, however, the amount of extraction agent and its concentration in the aqueous phase are suitably adapted to the molecular size of the dicarboxylic acid to be extracted. For example, mixtures containing dicarboxylic acids with from 4 to 10 carbon atoms in the molecule, such as are obtained by the oxidation of olein, are most advantageously extracted with aqueous solutions containing about 15% formic acid or dimethylformamide. For the extraction of dicarboxylic acids with from 7 to 13 carbon atoms in the molecule, such as those contained in the oxidation products of rapeseed oil fatty acids, aqueous solutions containing from 25 to 40% formic acid or dimethylformamide are used, while 40 to 70% aqueous formic acid or dimethylformamide solutions are most advantageous for use in the extraction of dicarboxylic acids having more than 13 carbon atoms in the molecule, such as those obtained by the oxidation of erucic acid.

The most favorable extraction conditions, for example the amount and concentration of the extraction agent to be used and the temperature at which the extraction is most efficient, can be readily determined by preliminary experiments.

The extraction of dicarboxylic acids may also be carried out in a fractional fashion by varying the conditions, such as the amount and concentration of extraction agent and/or the temperature, in stepwise fashion. Similarly, several of the above-mentioned variables may, if desired, also be varied in a proportional or inverse sense, depending upon the degree of fractionation intended.

In carrying out the separation of the formic acid or dimethylformamide solutions containing the extracted polycarboxylic acids from the extraction residue, it is sometimes advantageous to add electrolytes, particularly inorganic neutral salts, to the phase mixture. Suitable electrolytes for this purpose are primarily readily soluble salts of strong acids, for example the highly water-soluble chlorides, sulfates, or nitrates of ammonium, sodium, potassium, calcium and magnesium, or mixtures of such salts.

After the physical separation of the oily phase constituting the extraction residue from the extraction agent following the settling step, the dicarboxylic acids dissolved in the extraction agent can be precipitated therefrom by simply cooling the extraction agent solution. For this purpose, the temperature of the extraction agent is lowered until the precipitation of dicarboxylic acids begins and then further lowered until the precipitation appears to be complete. More particularly, it is advantageous to cool the separated extraction agent first to a temperature about 10° C. higher than the temperature at which the dicarboxylic acids begin to precipitate, in order to permit the precipitation of impurities which may be contained in the extraction agent solution. However, these impurities may also be effectively removed by passing the solution over porous solid materials, such as coke, activated charcoal, pumice stone, and the like. Upon further cooling of the extraction agent to the temperature at which precipitation begins, the dicarboxylic acids are then obtained in substantially pure form.

The dicarboxylic acids precipitated from the extraction agent in the above-described manner may then be recovered from the mother liquor; for example, by centrifuging or filtration, washing with small amounts of water and drying.

In the treatment of industrial products according to the present invention, the starting mixture very often contains a mixture of various dicarboxylic acids; it may therefore be desirable to combine the precipitation of the dicarboxylic acids from the extraction agent with a simultaneous fractionation of the acids. This may be accomplished through a stepwise precipitation; for example, by reducing the temperature stepwise during the precipitation or by stepwise diluting the aqueous formic acid or dimethylformamide solution used as the extraction agent during the precipitation phase.

A certain degree of fractionation takes place in most cases during the precipitation phase even if the temperature is not reduced stepwise or the extraction solution is not stepwise diluted, because the solubility of dicarboxylic acids increases as the number of carbon atoms in the acid molecule decreases, so that the lower decarboxylic acids in the starting material become more concentrated in the extraction agent, particularly in the case of a continuous extraction process wherein the extraction agent is recycled into the system after the extracted dicarboxylic acids have been precipitated from the extraction agent. If it is desired to recover the dicarboxylic acids contained in the extraction agent completely, the extraction agent is cooled to temperatures below 20° C., for example to from 0 to 10° C. Within this range of temperatures those dicarboxylic acids are also precipitated whose limit of solubility has not been reached at temperatures above 20° C. The dicarboxylic acids dissolved in the extraction agent may, however, also be completely recovered by distilling the extraction agent off. But in order to counteract the tendency of the extraction agent to fractionate during the distilling phase, it is advisable to add water continuously or in small portions to the solution being distilled so that the starting concentration of formic acid or dimethylformamide in the extraction agent is maintained.

When extracting polycarboxylic acids having more than two carboxyl groups in the molecule in accordance with the process herein disclosed, the statements made in connection with the extraction of dicarboxylic acids may be correspondingly applied. The amount of extraction agent used should also be such that at least two molecules of formic acid or dimethylformamide are present per molecule of polycarboxylic acid. The solubility of polycarboxylic acids having three or more carboxyl groups in the molecule is not only dependent upon the number of carbon atoms in the acid molecule, but also upon the number of carboxyl groups in the acid molecule. More particularly, the solubility of such polycarboxylic acids not only decreases with increasing length of the carbon chain, but also with an increase in the number of carboxyl groups attached to the carbon chain.

The selective extraction of di- and higher polycarboxylic acids, as above described, may advantageously be used fractionally to extract the components of polycarboxylic acid mixtures which contain no other types of components, if desired accompanied by a fractional precipitation. The polycarboxylic acid mixtures, which usually have an oily consistency, may thereby be gradually completely dissolved in the extraction agent.

The following examples will further illustrate my invention and enable others skilled in the art to understand the invention more completely, without any intention on my part, however, of limiting the invention to these examples.

*Example 1*

57.2 gm. of a mixture having an acid number of 403.5, consisting of 80% brassylic acid and 20% stearic acid, were melted and placed into a heatable tube containing 300 cc. of an aqueous 30% formic acid solution. The mixture of brassylic acid and stearic acid formed a layer over the 30% aqueous formic acid solution, and was thoroughly admixed with the 30% aqueous formic acid solution by blowing compressed air through a frit in the bottom of the tube while maintaining a temperature of about 90 to 99° C. The extraction agent entrained with the stream of air was condensed out in a cooling device and recycled into the tube. After about 30 minutes, the agitation with compressed air was stopped, whereupon the unextracted components separated out on the surface of the extraction solution containing the dicarboxylic acids. The extraction solution was then withdrawn from the tube through the bottom thereof at the extraction temperature; the oily residue remaining in the tube was again extracted with additional 300 cc. of 30% aqueous formic acid solution. After sufficient extraction in 8 different steps, using 2400 cc. of 30% aqueous formic acid solution as the extraction agent, the residue, which weighed 13.2 gm. and had an acid number of 238, contained 4.3% of the initial amount of brassylic acid.

The extraction solution saturated with dicarboxylic acid was cooled to about 20° C., whereupon 41.2 gm. of brassylic acid precipitated out in the form of well-defined, leaf-like crystals, while 3.8 gm. of brassylic acid remained in the mother liquor after separation of the crystalline acid which precipitated out at 20° C. The mother liquor was then evaporated to 500 cc. in a vacuum, admixed with 500 cc. water and again evaporated to 500 cc. After cooling, the major portion of brassylic acid remaining in the mother liquor crystallized out after a short time.

*Example II*

An oxidation product of erucic acid was freed from lower fatty acids having less than 10 carbon atoms by vacuum distillation. 252 gm. of the product thus obtained, having an acid number of 401 to 402, a saponification number of 425 to 427 and an iodine number of 0, was extracted 3 times with 1200 cc. of 40% aqueous formic acid solution at a temperature between 90° C. and slightly under the boiling point of the 40% aqueous formic acid solution, as described in Example I, and the extraction solution was separated from the oily residue. 191.0 gm. of brassylic acid crystallized out of the extraction solution in the form of leaf-like crystals, having an acid number of 457 to 460, when the extraction solution was cooled to 20° C. After filtering off the crystalline precipitate, 25.0 gm. of dicarboxylic acids remained in the extraction solution and the principal portion of these dicarboxylic acids was separated therefrom by evaporating the mother liquor to 500 cc., adding an equal amount of water and then again evaporating the solution to 500 cc. The extraction residue, after having been washed with water in the extraction column, evaporated in a vacuum and dried, weighed 36.0 gm., and had an acid number of 216, had a light-brown color, was brittle after cooling, and had very little odor in contrast to the distillation residue.

*Example III*

473 gm. rapeseed oil fatty acid were oxidized with chromic acid or nitric acid; thereafter the major amount of lower fatty acids passing over up to 120° C. at 1 to 2 mm. mercury was separated by distillation. The distillation residue, having an acid number of 444.1, a saponification number of 478.2 and an iodine number of 0.6, was melted and introduced in the molten state into the extraction tube, as in Example I, which was filled with 1250 cc. of a 40% formic acid solution. The extraction was carried out with the 40% aqueous formic acid solution, at a temperature between 90° C. and just under the boiling point of the formic acid solution, by agitating and separating the phases as explained in Example I.

In the first step, 126 gm. of dicarboxylic acid having an acid number of 472.5 were precipitated at room temperature from 1250 cc. of extraction agent in crystalline form. At 10° C., 32 gm. of dicarboxylic acids, having an acid number of 586, can be crystallized out of the mother liquor. The wash waters used on the crystalline products contained 13 gm. of dicarboxylic acids having an acid number of 605, which were recovered by evaporation. In second and third steps the extraction residue from the first step was again extracted with portions of 1250 cc. of a 40% aqueous formic acid solution at 90° C. up to just below the boiling point of the extraction agent, whereby 24 gm. of dicarboxylic acids having an acid number of 462, or 17 gm. of dicarboxylic acids having an acid number of 461 were precipitated out in crystalline form. In the second and third steps, the mother liquor contained 28 gm. of dicarboxylic acids in solution after crystallization at 20° C. and separation of the precipitated crystals, and these residual dicarboxylic acids were completely crystallized out by evaporation, as explained in Example II.

*Example IV*

From 606 gm. of oxidized rapeseed oil fatty acid as in Example III, 206 gm. of lower fatty acids having less than 10 carbon atoms in the molecule were separated by vacuum distillation. The melted distillation residue (400 gm.) was placed into the extraction tube and extracted in the first step with 2000 cc. of a 25% aqueous formic acid solution at temperatures between 90° C. and the boiling point of the extraction agent, as described in Examples I to III. After allowing the mixture to stand and allowing the phases to separate, the mixture was cooled to 80° C., the separated oily components were removed and the extraction agent containing dissolved dicarboxylic acids was passed through a column filled with coke and activated charcoal at 80° C. The solution, whch was at 80° C. after leaving the absorption column, was then cooled to 20° C., and the crystallized dicarboxylic acids were filtered off, then washed with a small amount of cold water on the filter and finally dried. 90 gm. of a dicarboxylic acid mixture, having an acid number of 520 and a saponification number of 521, were obtained. The mother liquor contained 49 gm. of dicarboxylic acids, having an acid number of 579 and a saponification number of 596, which were recovered by evaporation in a vacuum while adding water. In 5 further extraction steps the procedure was the same as the first extraction step, whereby dicarboxylic acids having more than 10 carbon atoms were precipitated out, primarily in crystalline form, while the small amounts of dicarboxylic acids having less than 10 carbon atoms which were still present in the starting material concentrated in the mother liquor. Altogether 202 gm. of dicarboxylic acids, having an acid number of 489 and a saponification number of 490, were separated out in crystalline form at 20° C., while 96 gm. of dicarboxylic acids, having an acid number of 571 and a saponification number of 585, were recovered from the mother liquors by evaporation while adding water.

The residue, weighing 100.5 gm. and having an acid number of 262 and a saponification number of 308, was a solid, yellow-brownish material which had little odor.

*Example V*

400 gm. of a rapeseed oil fatty acid oxidation product, substantially freed from lower fatty acids having less than 10 carbon atoms in the molecule and produced from 600 gm. of rapeseed oil fatty acid according to Example III, were thoroughly dispersed in the above-described manner for 30 minutes in 2000 cc. of a 25% aqueous formic acid solution, at temperatures between 90° C. and the boiling point of the formic acid solution. Thereafter, the mixture was allowed to settle and the extraction residue was separated from the extraction agent. The extraction solution was then cooled to 80° C., whereby entrained oily components separated out at the surface in the form of droplets. The extraction solution was passed through a column heated to 80° C. and filled with clay shard and activated charcoal. The extraction solution thus treated was then allowed to cool to 20° C., whereupon the dicarboxylic acids crystallized out. The crystals were filtered off from the mother liquor and washed with a small amount of water and finally dried. The mother liquor was again used for the extraction of the residue from the first extraction step. A total of 7 extractions with 2000 cc. of a 25% aqueous formic acid solution were carried out, including the first extraction, and in six of these extractions the mother liquor of the previous extraction was used as the extraction agent. From the extraction solutions of the first through the seventh extraction, a total of about 260 gm. of crystalline dicarboxylic acids were separated at 20° C., while at the end of the extraction in the seventh step 40 gm. of dicarboxylic acids remained dissolved in the 2000 cc. of mother liquor. The mother liquor was evaporated to about 400 cc., admixed with about 1000 cc. water, and again evaporated to about 400 cc. 33 gm. of crystalline dicarboxylic acids, having an acid number of 585 and a saponification number of 590, separated out, the acid number indicating that the precipitate consisted primarily of azelaic acid. The mother liquor (400 cc.) was then evaporated to dryness, whereby an additional 7 gm. of dicarboxylic acids, having an acid number of 555 and a saponification number of 567, were recovered. The extraction residue, weighing 100 gm. and having an acid number of 269.5 and a saponification number of 322.5, was light-brown, solid and had only a faint odor.

*Example VI*

319 gm. olein were oxidized according to Example III, and the lower fatty acids of less than 10 carbon atoms were separated by vacuum distillation. The distillation residue, weighing about 200 gm., was extracted by placing it into an extraction column filled with 1000 cc. of a 15% aqueous formic acid solution. The extraction was carried out at elevated temperature as explained in Examples I to V. The extraction agent was separated and then passed through an adsorption column at 80° C. which was filled with coke, activated charcoal or other porous acid-resistant materials, as described in Examples IV and V. Cooled to 20° C., the combined extraction agent from a total of 3 extractions yielded 114 gm. of a crystalline dicarboxylic acid mixture having an acid number of 583 and a saponification number of 589. Evaporation of the mother liquor and addition of water thereto yielded an additional 23 gm. of dicarboxylic acids having an acid number of 585 and a saponification number of 588. The residue weighed 63.0 gm. and had an acid number of 230 and a saponification number of 272. It had a light-yellow color and was of a solid consistency.

*Example VII*

150 gm. of crystalline, technically pure, commercial sebacic acid, having an acid number of 533, were fused with 50 gm. stearic acid, having an acid number of 197.5 and a saponification number of 198.5, and this mixture was placed in the fused state into an extraction column filled with 1000 cc. of a 25% aqueous solution of formic acid. The mixture was extracted, allowed to settle and separated as in Example I, and was then allowed to pass through an adsorption column filled with clay shard and activated charcoal at a temperature of about 90° C., as explained in Examples IV and V. In 3 extraction steps with a total of 3000 cc. of 25% aqueous formic acid solution, the procedure in the second and third extraction steps being the same as in the first, 135 gm. of crystalline sebacic acid, having an acid number of 546 and a saponification number of 547, were crystallized out at 20° C. and separated from the mother liquor by filtration. In the combined mother liquors 13 gm. of sebacic acid remained behind. The extraction residue, having an acid number of 205 and a saponification number of 223, and amounting to 26% of the starting mixture, had a very light color.

*Example VIII*

60 gm. of a mixture consisting of 20% stearic acid, having an acid number of 197 and a saponification number of 201, 50% brassylic acid, having a melting point of 110.5° C., an acid number of 459 and a saponification number of 461, and 30% propane-2,2-diadipic acid, having a melting point of 197.5° C., an acid number of 673 and a saponification number of 674, were fused together and placed in the fused state into a column filled with 300 cc. of a 35% aqueous solution of formic acid at 90° C. The carboxylic acid mixture formed an immiscible phase on the surface and was admixed with the extraction agent and extracted in accordance with Example I. After a total of 3 extractions, each with 300 cc. of the 35% aqueous formic acid solution, the extraction residue weighed 13 gm., had an acid number of 217 and a saponification number of 221, and consisted primarily of stearic acid. Upon cooling the combined extraction solutions to 20° C., well defined crystals of brassylic acid, having an acid number of 461 and a saponification number of 465, crystallized out. The mother liquor was evaporated to 300 cc., admixed with 300 cc. of water and again evaporated to a volume of 300 cc. Upon cooling the evaporated solution to 20° C., 9.2 gm. of brassylic acid, having an acid number of 457 and a saponification number of 461, crystallized out. The remaining solution was then evaporated to dryness, whereby 18.2 gm. of propane-2,2-diadipic acid, having an acid number of 664.5 and a saponification number of 671.0, were obtained.

*Example IX*

A carboxylic acid mixture obtained by splitting rapeseed oil was oxidized with a bichromate sulfuric acid solution, and the oxidized product was first freed from inorganic oxidation agent residues by washing with water, and then freed from lower fatty acids of less than 10 carbon atoms by vacuum distillation. 200 parts of the distillation residue, having an acid number of 444, a saponification number of 478 and an iodine number of 0.6, were placed into a column heated to about 95° C. and containing 2000 parts of a 20% aqueous solution of dimethylformamide. The two phases were then intensively admixed with each other for from 20 to 30 minutes by introducing compressed air into the bottom of the column while maintaining the temperature at about 95° C. After shutting off the stream of compressed air, the phases separated within a few minutes. When this separation took place too slowly, it was accelerated by the addition of 10 parts ammonium sulfate. The clear solution of the dicarboxylic acids in the extraction agent was withdrawn through the bottom of the column, while undissolved components of the oxidized product remained in the column, which were then extracted 4 times in the manner described, each time with 2000 parts of a 20% aqueous dimethylformamide solution. 38 parts of extraction residue, having an acid number of 214 and a saponification number of 267, remained behind, which consisted primarily of saturated fatty acids, esters and etholides. The extraction solution was heated again to 85° C. and then passed through a column containing clay shard, pumice stone, activated charcoal or any desired mixture of these materials, whereby finely dispersed oily components were adsorbed. The extraction solution leaving the column was completely clear. When the combined dimethylformamide solutions were cooled, the crystallization began at about 70° C.; upon cooling this solution to 18 to 20° C., 97 parts of dicarboxylic acids, primarily brassylic acid, having an acid number of 461 and a saponification number of 467, crystallized out. The mother liquor obtained upon filtering was evaporated to about 200 parts in vacuum and then diluted with about 500 parts water. At about 0° C., 38 parts of dicarboxylic acid with less than 10 carbon atoms, having an acid number of 567 and a saponification number of 572, separated out. The mother liquor freed from crystals was evaporated, whereby additional 28 parts of dicarboxylic acids, having an acid number of 582 and a saponification number of 587, were recovered.

Example X 200 parts of an oxidation product, having an acid number of 441.1, a saponification number of 478.3 and an iodine number of 0.6, freed from lower fatty acids and produced as in Example IX, were extracted with 2000 parts of a 30% aqueous dimethylformamide solution at 90 to 98° C., as in Example IX, and the extraction residue was separated from the solution. Similar to Example IX, the solution was purified in a column filled with porous corrosion-resistant material. At 18 to 20° C., 71 parts of dicarboxylic acids, having an acid number of 445 and a saponification number of 452, crystallized out. The mother liquor was separated from the crystallized dicarboxylic acids, and the crystalline acids were washed with cold water. The wash water was modified to contain 30% by weight of dimethylformamide and then combined with the mother liquor. 2000 parts of this solution were used for a repeated extraction of the residue obtained from the first extraction, according to the procedure described in Example IX. After separating the dimethylformamide solution, 43 parts of residue remained behind which had an acid number of 240 and a saponification number of 290.5. The dimethylformamide solution was cooled to between 18 to 20° C., whereby 18 gm. of dicarboxylic acids, having an acid number of 454 and a saponification number of 459, crystallized out. The mother liquor obtained upon filtering the above solution was admixed with 2000 parts of water, consisting, in part, of the wash water from the previous filtration, whereby an additional 14 gm. of dicarboxylic acids, having an acid number of 487 and a saponification number of 497, crystallized out at 18 to 20° C. The mother liquor obtained by filtration of the above solution was then evaporated to dryness and yielded 54 gm. of dicarboxylic acids, having an acid number of 564 and a saponification number of 570.

Example XI

Erucic acid was oxidized with nitric acid, and the oxidation product was freed from lower fatty acids having less than 10 carbon atoms by vacuum distillation. 200 parts of the distillation residue, having an acid number of 401 and a saponification number of 425 to 427, were extracted with 2000 parts of a 30% aqueous dimethylformamide solution at about 95° C., as described in the previous examples. By treating the extraction agent in accordance with Example IX, 132 parts of brassylic acid, having an acid number of 456 and a saponification number of 459, were recovered. The mother liquor was then combined with the wash water and dimethylformamide was added thereto until the starting concentration of 30% was reached, whereupon this solution was used for a second extraction. The second extraction yielded 36 parts of dicarboxylic acids, primarily brassylic acid having an acid number of 448 and a saponification number of 456. The mother liquor of the last crystallization was evaporated to dryness, leaving a residue consisting of 1 part of dicarboxylic acid.

Example XII 50 parts brassylic acid and 50 parts azelaic acid, both of technical purity, were admixed with each other and then fused, and the liquid mixture was admixed with 1000 parts of a 40% aqueous dimethylformamide solution. At about 90° C. the carboxylic acid mixture completely dissolved. After cooling to about room temperature, 48 parts of brassylic acid, having an acid number of 456 and a saponification number of 459, crystallized out. From the mother liquor, obtained by filtering off the brassylic acid, the azelaic acid was recovered by diluting with water to a dimethylformamide content below 5% or by distilling the solvent off.

Example XIII 50 parts of sebacic acid and 50 parts of adipic acid, both technically pure, were admixed and the mixture was fused; the molten mixture was then vigorously stirred into 1000 parts of a 15% aqueous dimethylformamide solution at 97° C. for about 30 minutes, whereby the acid mixture completely dissolved in the extraction agent. Upon cooling the solution to 18 to 22° C., 50 parts of sebacic acid separated out of the solution; the precipitate was filtered off and washed with a small amount of cold water; the filter cake was found to have an acid number of 557 and a saponification number of 560. The adipic acid still contained in the mother liquor was recovered according to the process described in the previous examples.

Example XIV 8 parts stearic acid, having an acid number of 201, 20 parts of brassylic acid, having an acid number of 459, and 12 parts of 2,2-propane-diadipic acid (a tetracarboxylic acid having 15 carbon atoms), having an acid number of 673, were admixed with each other and fused; the molten mixture was placed into a column filled with 400 parts of a 30% aqueous dimethylformamide solution. The mixture was intensively agitated for 30 minutes at 94 to 96° C., as described in Example IX, and then separated. The extraction residue was again admixed with 400 parts of a 30% aqueous dimethylformamide solution and extracted in the same manner. After 2 extractions a residue of 8.5 parts remained behind which had an acid number of 192 and a saponification number of 216. The combined dimethylformamide solutions were cooled to 18 to 20° C. 20 parts of brassylic acid, having an acid number of 452 and a saponification number of 460, crystallized out. The mother liquor, freed from these crystals, was evaporated to dryness in a vacuum, whereby 11.5 parts of 2,2-propane-diadipic acid, having an acid number of 664 and a saponification number of 671, were obtained.

The method of agitating the extraction agent with the polycarboxylic acid mixture—namely, by passing compressed air through the extraction column, as described in some of the examples above—is a convenient laboratory method of achieving intimate admixture between the components and should not be considered as an essential characteristic of the process according to my invention. The same advantageous agitating and mixing results can be achieved with extraction columns commonly employed in industry, regardless of whether they operate in concurrent or countercurrent fashion. Such apparatus includes, for example, extraction centrifuges, packed columns, and the like.

While I have given certain examples of specific embodiments of my invention, I wish it to be understood that the present invention is not limited to these examples and that various changes and modifications can be made therein without departing from the spirit of the invention or the scope of the appended claims.

I claim:

1. The method of separating water-insoluble aliphatic polycarboxylic acids having at least two carboxyl groups in the molecule from mixtures containing such polycarboxylic acids together with higher monocarboxylic acids, which comprises intimately dispersing such mixtures in a 5 to 70% aqueous solution of a compound selected from the group consisting of formic acid and dimethylformamide, at a temperature between 50 and 250° C., until substantially all of the polycarboxylic acids dissolve in said aqueous solution, and separating the polycarboxylic acids from said aqueous solution.

2. The method of separating water-insoluble aliphatic polycarboxylic acids having at least two carboxyl groups in the molecule from mixtures containing such polycarboxylic acids together with higher monocarboxylic acids, which comprises intimately dispersing such mixtures in a 5 to 70% aqueous solution of a compound selected from the group consisting of formic acid and dimethylformamide, at a temperature between 50 and 100° C., until substantially all of the polycarboxylic acids have been dissolved in said aqueous solution, separating said aqueous solution from the components of said mixtures which remain undissolved in the aqueous solution, and separating said dissolved polycarboxylic acids from the aqueous solution.

3. The method of separating water-insoluble aliphatic polycarboxylic acids having from 2 to 7 carboxyl groups in the molecule from mixtures containing such polycarboxylic acids together with other water-insoluble components, which comprises intimately dispersing such mixtures in a 5 to 70% aqueous solution of a compound selected from the group consisting of formic acid and dimethylformamide, at a temperature between 50 and 100° C., until substantially all of the polycarboxylic acids have been dissolved in said aqueous solution, separating said aqueous solution from the components of said mixtures which remain undissolved in the aqueous solution, cooling said aqueous solution to a temperature between 0 and 20° C., whereby said dissolved polycarboxylic acids precipitate out of said aqueous solution, and separating the precipitated polycarboxylic acids from the aqueous solution.

4. The method of separating water-insoluble aliphatic polycarboxylic acids having at least 10 carbon atoms and from 2 to 7 carboxyl groups in the molecule from mixtures containing such polycarboxylic acids together with other water-insoluble components, which comprises intimately dispersing such mixtures in a 5 to 70% aqueous solution of formic acid, at a temperature between 50 and 100° C., until substantially all of the polycarboxylic acids have been dissolved in said aqueous solution, separating said aqueous solution from the components of said mixtures which remain undissolved in the aqueous solution, cooling said aqueous solution to a temperature between 0 and 20° C., whereby said dissolved polycarboxylic acids precipitate out of said aqueous solution, and separating the precipitated polycarboxylic acids from the aqueous solution.

5. The method of separating water-insoluble aliphatic polycarboxylic acids having at least 10 carbon atoms and from 2 to 7 carboxyl groups in the molecule from mixtures containing such polycarboxylic acids together with other water-insoluble components, which comprises intimately dispersing such mixtures in a 5 to 70% aqueous solution of dimethylformamide, at a temperature between 50 and 100° C., until substantially all of the polycarboxylic acids have been dissolved in said aqueous solution, separating said aqueous solution from the components of said mixtures which remain undissolved in the aqueous solution, cooling said aqueous solution to a temperature between 0 and 20° C., whereby said dissolved polycarboxylic acids precipitate out of said aqueous solution, and separating the precipitated polycarboxylic acids from the aqueous solution.

References Cited in the file of this patent

UNITED STATES PATENTS

| | | |
|---|---|---|
| 1,945,246 | Witzel | Jan. 30, 1934 |
| 2,369,036 | Fitzpatrick et al. | Feb. 1, 1945 |
| 2,470,849 | Hanson | Mar. 24, 1949 |
| 2,662,908 | Logan | Dec. 15, 1953 |
| 2,716,133 | Pooler | Aug. 23, 1955 |
| 2,731,495 | Emslie | Jan. 17, 1956 |